Patented May 5, 1953

2,637,719

UNITED STATES PATENT OFFICE 2,637,719

SILOXANE COMPOSITIONS AND METHOD OF MAKING SAME

John E. Dereich, Painesville, Ohio, assignor to Diamond Alkali Company, Cleveland, Ohio, a corporation of Delaware No Drawing. Application June 1, 1949, Serial No. 96,618

27 Claims. (Cl. 260—46.5)

This invention relates to resinous compositions comprising siloxanes, and more particularly relates to resinous compositions comprising the hydrolyzates of a reaction product of a partial ester of an organo-trihalosilane and a hydrolyzate of a diorganic-dihalosilane, and to methods of making such reaction products.

Resinous hydrolyzates of organo-trihalosilanes have long been known and have received much attention experimentally because of their high degree of heat stability. The principal difficulty in most applications of these resins to molding compositions stems from their brittleness and consequently from the sensitivity of molded articles made therefrom to mechanical shock. Much experimental work has been done in an effort to modify the molecular structure of the resinous hydrolyzates of organo-trihalosilanes in order to decrease the brittleness of these materials without substantially decreasing the high degree of heat stability thereof.

One of the causes of brittleness exhibited by the condensed hydrolyzates of organo-trihalosilanes is said to be the manner in which such hydrolyzates condense intermolecularly, with the consequent loss of the elements of water, forming highly cross-linked macro-molecules. In order to modify the brittleness of these materials, workers in the art have heretofore sought to lessen the tendency of the molecules of these hydrolyzates to cross-link by combining a di-organo-dihalosilane with the organo-trihalosilane prior to carrying out the hydrolysis reaction. In this manner, it was hoped that the siloxanes derived from the co-hydrolysis product of the diorgano-dihalosilane and the organo-trihalosilane would be less brittle and more tenacious. Such physical properties would be indicative of a condensation reaction taking place between the hydrolyzates of the two products in such a manner that the molecules of the condensation product would be possessed of long chains with only occasional cross-linking between the chains.

Another method by which the workers in the prior art have sought to lessen the tendency of the hydrolyzates o f organo-trihalosilanes to cross-link during the condensation thereof has been an attempt to control the hydrolysis reaction in such a manner that the condensation reaction, subsequent to hydrolysis, proceeds slowly and in an orderly manner. In attempting to accomplish this end, the prior art workers have incorporated halogen acid sequestering agents in the hydrolysis reaction mass, since free halogen acid in contact with organo-silane hydrolyzates accelerates the condensation reaction. The halogen acid sequestering agents do in fact modify the physical properties of brittless and tenacity of the condensed hydrolyzates to a modest extent but fall far short of producing a resinous siloxane material strikingly different from that obtained by other prior art methods.

In contrast to compositions obtained by the above-described methods, the present invention includes compositions in which organo-trihalosilanes are employed as starting substances for a whole series of siloxane materials, which include initially viscous liquids curable to resilient resinous materials, easily friable solids which are rapidly convertible to hard, tough, tenacious resins, and variations and combinations of resins having such properties, thus increasing the field of use to which siloxane materials are applicable.

In accordance with the method of the present invention, the novel siloxanes are obtained by combining a compound of the general formula $RSi(OY)_nX_{3-n}$ wherein R and Y are selected from the group consisting of alkyl, aryl, alkaryl, and aralkyl radicals, X is a halogen, and n is a number between 1 and 2, with a hydrolyzate of a compound of the general formula $R'R''SiX_2$ wherein R' and R'' are selected from the group consisting of alkyl, aryl, alkaryl, and aralkyl radicals, and X is halogen, and reacting the mixture thus obtained with a strong dehydrating mineral acid, hydrolyzing the resulting reaction product, and subjecting the hydrolyzate thus obtained to intermolecular condensation.

It is presently believed that condensation of the hydrolyzates of the compound $R'R''SiX_2$, which proceeds spontaneously upon hydroysis of the compound, produces a mixture of cyclized and linear polymers having recurring R'R''SiO groups and being, in the case of incomplete hydrolysis, halo-substituted at the ends of the linear molecule or hydroxyl substituted where hydrolysis is complete and condensation products in which the rings are made up of Si and O atoms in alternate positions therein, to give compounds of the type $(R'R''SiO)_{n'}$ wherein $n'$ is a variable greater than 2. The system obtained upon hydrolysis of $R'R''SiX_2$ compounds is believed to be dynamic in composition and the precise proportions of linear and cyclic components believed dependent upon conditions of preparation. Without regard to precise proportionate compositions, however, it is believed that the action of the dehydrating acids opens the rings of the cyclic condensed hydrolyzates of the diorgano-dihalosilanes, with consequent formation of terminal —OH or acid radical groups, at the point of rupture of the cyclized compound and additionally, in some as yet unexplained manner, may activate the terminal groups of the linear molecules already present. Also, it is believed that these terminal groups react with the halogen of the compound $RSi(OY)_nX_{3-n}$ to eliminate halogen acid and form molecules, the predominant structure of which is diagrammatically represented by the following formula, although other possible structures may also exist concurrently therewith:

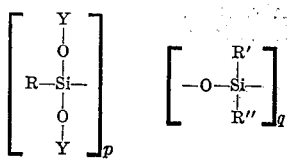

wherein $p$ and $q$ are variables of unknown value.

As the acid-treated condensed hydrolyzate of the dihalosilane includes molecules having interreactive —OH groups in terminal position, intercondensation, either between separate molecules or to re-form rings, with evolution of water appears possible. However, since the water evolved, especially in the acid environment, might be expected to hydrolyze the (OY) groups of the $RSi(OY)_nX_{3-n}$ molecules prematurely, prior to the completion of the halogen acid eliminating reaction, and since further, especially in view of the properties of the compositions of this invention, only insignificant premature hydrolysis of (OY) groups is believed to occur, it seems clear that the halogen acid eliminating reaction proceeds at a much higher rate than the postulated premature hydrolysis.

Subsequently, upon the elimination of substantially all of the halogen as halogen acid, the reaction product obtained is hydrolyzed by adding it to water or a mixture of ice and water, whereupon some heat of reaction is evolved and YOH is eliminated. In some instances, for example, where a large proportion of dehydrating acid is used, direct or indirect cooling of the hydrolysis reaction mass may be employed. In this manner, the Y radicals are removed by hydrolysis and hydrogen atoms substituted therefor, thus presenting —OH groups attached to silicon atoms, which —OH groups may then react intermolecularly with the consequent loss of the elements of water to form macromolecules of less cross-linked structure than hydrolyzates of the organo-silicon trihalides.

R in the general formula $RSi(OY)_nX_{3-n}$ may be a hydrocarbon radical, such as an alkyl radical, exemplified by a methyl, ethyl, propyl, butyl, or higher alkyl radical, carbon chains of 10 to 15 carbons and above being possible but in general not preferred, except for specific uses, in view of loss of heat stability experienced in such compositions, or R may be an aromatic radical, such as phenyl, tolyl, xylyl, or other aryl or alkaryl radical; also included are such radicals as the aralkyl radicals exemplified by the benzyl radical, the beta phenylethyl radical, or the beta- and gamma-phenylpropyl radicals, as well as multinuclear aromatic radicals, such as the naphthyl radical. In addition, the R radical in the above general formula may suitably represent composite mixtures of alkyl radicals, such as methyl and ethyl, mixtures of alkyl radicals with aryl radicals, aralkyl radicals, or alkaryl radicals, such as ethyl with phenyl, tolyl, or benzyl respectively, as well as composite mixtures of aryl radicals, such as phenyl and naphthyl, or mixtures of aryl radicals with aralkyl radicals, or alkaryl radicals, such as phenyl with tolyl or benzyl respectively. Moreover, R may be a radical of a heterocyclic compound, such as thiophene, or may represent a mixture of radicals comprising radicals of a heterocyclic compound with other hydrocarbon radicals.

(OY) of the first general molecular formula represents in effect a blocking agent hydrolyzable at a slower rate than the halogen acid eliminating reaction discussed above.

The (OY) component may be derived from an alcohol or phenol, directly or indirectly. It is preferred to employ derivatives of lower alkyl radicals, such as methyl, ethyl or propyl, inasmuch as the higher alkyl derivatives, for example, hexyl, heptyl, and octyl, tend to hydrolyze less readily than their lower alkyl homologues. However, this relative inertness to hydrolysis is not detrimental to the products or methods of the present invention since it tends only to reduce the rate of premature and ultimate hydrolysis. The reduction of rate as to premature hydrolysis is in most cases unnecessary, though not detrimental, and the reduction of rate as to ultimate hydrolysis has not been found to be a serious handicap. For substantially the same reasons, the derivatives of phenol (hydroxy benzene) are in general not employed as Y substituents in the preparation of the compounds of this general formula.

The halogen atoms (X) of the general formula above may be fluorine, chlorine, bromine, or iodine. The fluorine derivatives are expensive to prepare and less amenable to hydrolysis than the other members of the halogen elements, and the bromine and iodine derivatives, in addition to sharing the expensive feature of the fluorine derivatives, are also less stable and for that reason, less desirable in the method of the present invention. It is therefore preferred to employ chlorine derivatives since these compounds react to form the desired linkages with elimination of hydrogen chloride; the element itself is very plentiful and cheap; and, moreover, recovery of elemental halogen or halogen compounds is not required in order to obtain an economically feasible process.

In the second general formula, $R'R''SiX_2$, noted hereinabove, the R' and R'' radicals may be chosen with the same latitude in the classes of particular organic radicals as in the case of the R radicals. It is, however, desirable for economic reasons to employ the lower alkyl derivatives, or the lower aromatic derivatives, or derivatives containing different radicals of the lower aliphatic and aromatic groups in the same molecule. It is also desirable to employ these derivatives in order that the maximum heat and oxidation resistance of the final products to be obtained from the method of the present invention may be had.

The compound of the general formula $$RSi(OY)_nX_{3-n}$$

may be prepared by any suitable means, the method of its preparation not forming a part of the present invention. For example, it may be prepared by first isolating, by known methods, an organo-trihalosilane represented by the formula $RSiX_3$ and then reacting such trihalosilane with any suitable alcohols or phenols, as noted in the discussion of (OY) above, in the ratio of one mol of the organo-trihalosilane to one to two mols of alcohol.

The hydrolyzate derived by hydrolysis from the compound of the general formula R'R''SiX$_2$ is suitably prepared by reacting a Grignard reagent with a silicon tetrahalide in the presence of an ether, isolating the diorgano-dihalosilane by distilling the reaction mass, and hydrolyzing this product with water to obtain a hydrolyzate. This material may be used "as is" in the method of the present invention or may be subjected to further heating in order to volatilize low molecular weight components thereof. Characteristically, the hydrolyzates of the diorgano-dihalosilanes are liquids at ordinary temperatures and completely dissolve in the partially esterified derivatives of the organo-trihalosilanes.

The ratio in which RSi(OY)$_n$X$_{3-n}$ and the hydrolyzate of R'R''SiX$_2$ are suitably combined with the aid of a strong dehydrating mineral acid may be varied over a very wide range with the result that the hydrolyzates of the initial products obtainable by the method of the present invention range from thick, viscous liquids, through resilient, rubbery solids, to hard, tough, resinous materials of relatively high tenacity even in the uncured or incompletely condensed condition. Some of the general physical characteristics of the resins obtainable, when approximately 90% to 95% by weight of the compound of the formula RSi(OY)$_n$X$_{3-n}$ and approximately 5% to 10% of the hydrolyzate of R'R''SiX$_2$ are combined in accordance with the method of the present invention to form siloxane materials, may be illustrated by the following combinations: When R, R', and R'' are all the same organic hydrocarbon radical, particularly when they are all of the same lower alkyl group, for example, when R, R', and R'' are all ethyl or methyl radicals, the partially condensed hydrolyzates obtained are resilient, rubbery materials which are curable by further intermolecular condensation to solid, flexible resins. When the radicals R, R', and R'' are not all alike, for example, when R is a lower alkyl hydrocarbon radical, specifically methyl or ethyl, and R' is, for example, a phenyl radical, and R'' is a lower alkyl hydrocarbon radical, such as methyl or ethyl, the partially condensed hydrolyzates obtainable are resilient, rubbery materials curable to tough, resinous, flexible solids, exhibiting somewhat more strength and toughness than is obtained when R, R', and R'' are all methyl or ethyl radicals, as in the example described above.

As noted generally above, R in the above formula may also be a composite mixture of two or more alkyl or aryl hydrocarbon radicals or a mixture of alkyl and aryl hydrocarbon radicals. For example, methyl, ethyl, etc., silicon trihalides may be mixed with phenyl, tolyl, or xylyl silicon trihalides in various proportions or a mixture of lower alkyl silicon trihalides, such as ethyl or methyl silicon trihalides, may be mixed with an aralkyl silicon trihalide, such as benzyl silicon trihalide. The R' and R'' radicals may then suitably be lower alkyl radicals, such as ethyl or methyl radicals, in which event the partially condensed hydrolyzates are easily friable materials curable to hard, tough resins. A particularly useful variation of the above-described resins having superior heat resistance is obtained where R is a composite mixture of lower alkyl, such as methyl or ethyl, with phenyl radicals, and R' and R'' are selected from the group of lower alkyl radicals, such as ethyl or methyl, and aromatic hydrocarbon radicals, such as the phenyl, tolyl, or xylyl radicals. Partially condensed hydrolyzates obtainable from this combination of compounds result in easily friable, solid materials which are curable to hard, tough, resinous solids of superior tensile and flexural strength.

The hydrolyzed and condensed materials derived from the general types of reaction products of a strong dehydrating mineral acid with RSi(OY)$_n$X$_{3-n}$ and the hydrolyzate of R'R''SiX$_2$ may suitably be modified by increasing or decreasing the proportion of RSi(OY)$_n$X$_{3-n}$ in the initial reaction mixture to increase or decrease the ultimate hardness or flexibility as desired. For example, if the proportions of other reactants are kept constant, decreasing the relative proportion of the compound RSi(OY)$_n$X$_{3-n}$ decreases the hardness of the ultimate condensed and cured product, whereby the cured material is more flexible and much more resistant to thermal and mechanical shock. When this compound is present in the initial reaction mixture to the extent of about 70% or less thereof, the hydrolyzed reaction products, prior to condensation or "curing," may vary from viscous liquids requiring extended heat treatment to condense the same to resinous substances, to readily heat hardenable, flexible resins. Moreover, in general, as the proportion of ester groups in the RSi(OY)$_n$X$_{3-n}$ molecule increases from one to two, the ultimate resin decreases slightly in hardness but such decrease in hardness is without noticeable change in toughness or tensile strength. The range of ratios of RSi(OY)$_n$X$_{3-n}$ to the hydrolyzate or R'R''SiX$_2$ may suitably be varied in accordance with the teachings of the present invention for the preparation of resinous materials from approximately 20:1 to 1:1, depending upon the physical characteristics, particularly hardness and flexibility, which may be desired in the condensed and cured resin finally to be obtained. When manufacturing hard, tough, heat-resistant molding resins, it is preferable to maintain the ratio of RSi(OY)$_n$X$_{3-n}$ to R'R''SiX$_2$ hydrolyzate within the approximate range of 10–20:1 and, as noted above, to employ the lower aryl and alkyl derivatives thereof.

A particularly interesting group of such molding resins has been found to exist in the compounds wherein R is a composite mixture made up of varying proportions of predominantly aromatic radicals, preferably phenyl, with a relatively minor proportion of lower alkyl hydrocarbon radicals, especially methyl and ethyl radicals. Thus, a mixture of phenyl, tolyl, or xylyl silicon trihalides with methyl or ethyl silicon trihalides combined in the ratio of four mols of the aryl silicon trihalide to one mol of the methyl or ethyl silicon trihalide may be esterified with a sufficient amount of a suitable alcohol, for example, methyl alcohol, to react with an average of one to two of the halogens per mol of the mixed organo-trihalosilane. The mixture of partial ester derivatives of the organo-trihalosilanes is then mixed with the R'R''SiX$_2$ hydrolyzate and contacted with acid as described above.

For the purpose of the present reaction, strong dehydrating mineral acids, which do not exhibit oxidizing properties under the conditions of treatment, may be employed, preferably sulfuric acid or ortho phosphoric acid. Such acids may be used in amounts varying from 0.1 to 10 weight % based upon the reaction mix, a preferred range for general purposes being 0.3 to 3%. The nature of the dehydrating acid and the relative amount employed affect the physical properties of the final product to be obtained. In general, where the product obtained as a cured hydrolyzate is more flexible or less tenacious than that which is desired, the flexibility of such product may be decreased and the tenacity thereof increased by increasing the proportion of the dehydrating acid employed; where the proportion of such dehydrating acid and the amount of hydrolyzate of $R'R''SiX_2$ are increased simultaneously, it is possible to retain most of the flexibility of the parent compound in the cured product, while increasing the tenacity of the off-spring thereof.

The resins obtained according to the method of the present invention are compatible with a wide variety of mineral fillers, such as silica, mica, glass in the form of comminuted particles or as fibers or fibrous webs, magnesium oxide, asbestos in either fiber or web form, galena, lead sulfate, basic lead sulfate, antimony sulfide, barium sulfate, carbon black, calcium carbonate, and the like, as well as synthetic resinous polymeric materials, such as the copolymers of butadiene-acrylonitrile, polymerized acrylic acid esters, and the like; resinous molding compositions having a high degree of heat resistance, as well as physical properties superior to those of siloxane compositions presently known in the art, may be obtained by combining the products of the method of the present invention with these materials.

In addition, the initial reaction products of the method of the present invention, prior to the hydrolysis thereof, may be cohydrolyzed and ultimately co-condensed with organo-silicon halides of the formula $R_aSiX_{4-a}$ wherein R and X have the meaning discussed above and $a$ is between 0 and 3. The physical properties of such condensed cohydrolyzates may be may be varied in somewhat the same manner as those of the hydrolyzates of the reaction products of the combination of $RSi(OY)_nX_{3-n}$ and $R'R''SiX_2$ hydrolyzate. Similarly, these cohydrolyzates are compatible with inorganic filler materials and resinous organic elastomers of the type noted above.

In order that those skilled in the art may better understand the method of the present invention and particular manners in which the same may be carried into effect, as well as the characteristics and properties illustrative of the products to be obtained thereby, the following specific examples are offered:

Example I

*Part A.*—Dimethyl silicon dichloride is slowly added to an amount of cold water in excess of that required to hydrolyze the dimethyl silicon dichloride, the hydrolysis mass being vigorously stirred during the entire addition and for approximately 10 minutes thereafter. The hydrolyzate of the dimethyl silicon dichloride separates from the aqueous portion of the hydrolysis mass, is washed with an aqueous alkaline solution to neutralize the excess hydrochloric acid which may be present therein, and is dried over calcium chloride.

*Part B.*—Three mols of methyl silicon trichloride are placed in a three-neck, round-bottom, one liter flask equipped with a mechanical stirrer, a reflux condenser, and a dropping funnel. Six mols of methyl alcohol are placed in the dropping funnel and added slowly, with constant agitation, to the methyl silicon trichloride. The total time allowed for the reaction to take place is four hours. The reaction mass is heated further with continued agitation until substantially all evolution of hydrogen chloride has ceased.

*Part C.*—70 parts by weight of the partial methyl ester of methyl silicon trichloride, as prepared in Part B above, are combined with 5 parts by weight of the hydrolyzate of dimethyl silicon dichloride, as prepared in Part A above, in an Erlenmyer flask equipped with a reflux condenser and to this mixture there is added 2 parts by weight of 95% sulfuric acid. The mixture is refluxed for 45 minutes and the reaction product thus obtained is then diluted with an equal volume of isopropyl ether and hydrolyzed by pouring slowly into cold water with constant agitation. The hydrolyzate of the reaction product is neutralized by contacting with solid sodium carbonate until the evolution of carbon dioxide has ceased, washed, and the hydrolyzate solution then separated from the washings.

*Part D.*—A portion of the ether solution of the hydrolyzate obtained from Part C above is placed in an evaporating dish and the ether evaporated therefrom by gently heating the solution under reduced pressure. After substantially all of the solvent ether has been evaporated, the partially condensed residue appears as a somewhat plastic, friable powder. When this powder is molded under a pressure of 4000 lbs. per square inch at a temperature of 130° C. for a period of one-half hour, a flexible, rubber-like solid is obtained. Further heat treatment at 275° C. for a period of 4 hours to effect the cure decreases the flexibility and increases the tensile strength of the molded piece.

Following the teaching of Example I, modifying proportions of materials as necessary, comparable materials may be obtained from ethyl, propyl, butyl, amyl, dialkoxy silicon halides and higher aliphatic homologues, as well as such halides of the derivatives of the isomers of higher homologous aliphatic radicals and the analogous alicyclic radicals, such as cyclopentyl and cyclohexyl. Similarly, higher dialkyl analogues of the hydrolyzates of dialkyl silicon dihalides may be employed. The hydrolyzates of these higher aliphatic homologues in general require more extended heat treatment to produce resinous solids than do the lower aliphatic derivatives and are less stable at elevated temperatures when exposed to air and moisture than the lower aliphatic derivatives.

Example II 5 parts of the hydrolyzate of phenyl ethyl silicon dichloride, prepared in the same manner as that described in Part A of Example I, and the 70 parts of the partial methyl ester of ethyl silicon trichloride, prepared in accordance with the method described in Part B of Example I, are combined in an Erlenmyer flask, and 2 parts by weight of concentrated phosphoric acid ($H_3PO_4$—85%) are added thereto and the mixture heated to reflux temperature in the manner described in Part C of Example I. The isolation of the reaction product and the hydrolysis thereof, as well as the partial condensation of the hydrolyzate, are carried out in the same manner as described in Part D of Example I. The molded, partially condensed hydrolyzate is a strong, somewhat flexible solid.

In addition to the hydrolyzate of phenyl ethyl silicon dichloride employed in the above experiment, other analogues or homologues of the aromatic and aliphatic radicals may suitably be used. For example, in place of the phenyl radical, the tolyl, xylyl, naphthyl, ethylphenyl, or other aryl or alkaryl radical may be employed. The characteristics of this group of hydrolyzates having dissimilar organic radicals attached to Si atoms in the hydrolyzates of the diorgano-silicon dihalide, are a bond from a carbon atom of an aromatic nucleus to the silicon atom of the condensed hydrolyzate molecule and an alkyl radical bonded to the same Si atom. Moreover, the ethyl radical of the condensed hydrolyzate molecule may suitably be replaced by its higher alkyl homologues or analogues and isomers of these radicals by employing the appropriate derivative of such radicals in the preparation of the diorgano-silicon dihalide.

*Example III*

The partial methyl ester of phenyl silicon trichloride is prepared as in accordance with the method described in Part B of Example I and 70 parts by weight thereof are mixed with 5 parts by weight of the hydrolyzate of dimethyl silicon dichloride, as prepared in Part A of Example I, and the mixture thus obtained treated with 2 parts by weight of concentrated sulfuric acid (95%). The reaction mass is treated in the manner described in Parts C and D of Example I and the partially condensed hydrolyzate obtained molds very readily to a hard, tough, resinous material, which becomes somewhat harder, and more tenacious without becoming brittle, upon further heating at 275° C. for a period of 4 hours.

Similar resinous materials are prepared by substituting other aryl radicals for the phenol radical of the phenyl dialkoxy silicon chloride in the above experiment. Suitable substitutes are mono-, di-, and trisubstituted phenyl and diphenyl radicals, such as the methyl, ethyl, propyl, butyl, and higher alkyl substituted materials, and the naphthyl radical and its similar polyalkyl derivatives. The characteristic of the organo dialkoxy silicon halide compound is the bond between a carbon atom of an aromatic nucleus and the silicon atom of the dialkoxy compound.

The same latitude in the choice of alkyl derivatives in the hydrolyzate of the diorgano-silicon dihalide exists in the preparation of resins of this group, as that set forth in Example I above.

*Example IV*

24 parts by weight of the hydrolyzate of dimethyl silicon dichloride, prepared as described in Part A of Example I, are combined with 192 parts of the partial methyl esters of a mixture of phenyl silicon trichloride and ethyl silicon trichloride (in the molar ratio of 0.8:0.2), prepared by reacting a mixture of 167 parts by weight of phenyl silicon trichloride and 32 parts by weight of ethyl silicon trichloride with 64 parts by weight of methyl alcohol. 8 parts by weight of sulfuric acid (95%) are added to the mixture of the hydrolyzate of dimethyl silicon dichloride and the partial esters of a mixture of phenyl and ethyl silicon trichlorides. The addition of the sulfuric acid is made dropwise with constant agitation. A white, powdery precipitate is momentarily formed as each drop of the sulfuric acid enters the body of the solution of reactants and the intensity of the color of the solution decreases slightly as the addition is continued. After all of the sulfuric acid has been added to the reactor, the temperature of the reactants within the flask is kept at reflux by means of a very low gas flame until the evolution of hydrogen chloride from the reaction mixture has ceased. The time required for the reaction to reach substantial completion is approximately 30 minutes. The flask is then cooled and the solution diluted with twice its volume of diethyl ether. The thus-diluted reaction mass is added slowly with constant agitation to a mixture of ice and water, the amount of water being in great excess of that required to hydrolyze the reaction product. The ether layer is then separated from the aqueous layer; the emulsion formed in the aqueous layer during the hydrolysis reaction is broken by neutralizing with sodium carbonate; and the recovered solution of hydrolyzate is combined with the ether layer. The solution of the hydrolyzate thus obtained is washed several times with water, separated from the water washings, and dried over anhydrous sodium sulfate. Upon evaporation of the solvent ether, a clear, slightly amber, resinous material is obtained which, when combined with approximately 1% of triethanolamine, condenses rapidly (in a matter of about 15 minutes) to a very tough, flexible resin. This resinous material, when molded at 4000 lbs. per square inch at a temperature of 180° C. for a period of one-half hour, gives a clear, amber, solid molding which may be removed from the mold while still hot without losing its shape or adhering to the mold cavity.

This resinous product is illustrative of those obtainable from mixtures of aryl and alkyl dialkoxy halosilanes with hydrolyzates of dialkyl silicon dihalides to obtain ultimate condensates ranging from soft, resilient, rubber-like materials to hard, tough resins. Further variations of the physical properties of this group are obtainable by employing other mixtures of aryl alkoxy halosilanes and alkyl alkoxy halosilanes with hydrolyzates of the other dialkyl, diaryl, or alkyl aryl dihalosilanes. Thus, alkyl substituted phenyl or diphenyl derivatives, as well as naphthyl derivatives, of the alkoxy halosilanes may also be employed to obtain "tailor made" resins having specific properties for specific purposes. As a general basis from which physical characteristics of these resins may be predicted, it has been found that mixtures containing 80% of phenyl dimethoxy silicon chloride with 13% of methyl, ethyl, or benzyl dimethoxy silicon chloride, combined with 7% of the hydrolyzate of dimethyl silicon dichloride, diethyl silicon dichloride, or phenyl ethyl silicon dichloride, treated either with concentrated sulfuric acid or concentrated ortho phosphoric acid, yield hydrolyzates condensible to hard resins of relatively high tensile strength. As noted hereinabove, the hardness of these resins is decreased by increasing the relative properties of the hydrolyzate of a diorgano-dihalosilane and the dehydrating mineral acid; similar effects are obtainable by employing higher molecular weight alkyl or aralkyl derivatives of these alkoxy halosilanes in admixture with other aryl or alkaryl alkoxy halosilanes.

*Example V*

5 parts by weight of a hydrolyzate of diethyl silicon dichloride, prepared as described in Part A of Example I above, are combined with 70 parts by weight of a partial methyl ester, prepared by the reaction of benzyl silicon trichloride with methyl alcohol in accordance with the method described in Part B of Example I above, and the mixture thus obtained is reacted with 2 parts by weight of concentrated sulfuric acid (95%). The reaction of this mixture of ingredients, the hydrolysis of the reaction product, and the partial condensation of the hydrolyzate are carried out in the manner described in Parts C and D of Example I above. A very viscous liquid, which does not readily condense to a solid material upon prolonged heating, is obtained.

In addition to the hydrolyzate of diethyl silicon dichloride employed in the above experiment, the dimethyl, dipropyl, dibutyl, and higher dialkyl silicon dihalide derivatives may be employed to obtain viscous oils suitable for use as lubricants and fluids for hydraulic systems, as well as heat exchange media.

Example VI 60 parts by weight of the partial methyl ester of phenyl silicon trichloride and 10 parts by weight of the partial methyl ester of ethyl silicon trichloride are combined with 5 parts by weight of concentrated sulfuric acid (95%). The hydrolyzate of dimethyl silicon dichloride is prepared in the manner described in Part A of Example I. The partial esters of phenyl silicon trichloride and ethyl silicon trichloride are prepared by reacting one mol of the respective organo-silicon trichlorides with two mols of methyl alcohol in the manner described in Part B of Example I. The reaction of the partial esters, the hydrolyzate, and the sulfuric acid, as well as the subsequent treatment of the reaction product, are carried out in the manner described in Parts C and D of Example I. The molding obtained from the condensed hydrolyzate of the reaction product is a hard, tenacious, resinous solid, which may be removed from the mold cavity while still hot without adhering to the mold cavity or deforming the molded shape.

This is a variation of the type of resin prepared as described in Example IV above and in the preparation of resins of analogous chemical structures, the same latitude as that suggested by Example IV in selecting the substituents to be attached to the silicon atoms may be exercised.

Example VII

A mixture of 400 parts by weight of dimethoxy phenyl silicon chloride and 78 parts by weight of dimethoxy ethyl silicon chloride, prepared as in Example IV, is combined with 35 parts by weight of the hydrolyzate of dimethyl silicon dichloride, prepared in the manner described in Part A of Example I above; 15 parts by weight of concentrated phosphoric acid ($H_3PO_4$—85%) are added. The reaction mass is agitated while the mixture is heated to the temperature at which gentle reflux is obtained. While the heating and agitation are continued, hydrogen chloride is evolved and the solution is bleached to a slightly lighter color than that of the original mixture. Heating of the reaction mixture is continued for a period of approximately 45 minutes until substantially all of the HCl evolved in the reaction has been driven off. At the end of this time, agitation of the reaction mass is stopped, the reactor is cooled, and the products diluted with twice its volume of ethyl ether. The thus-diluted reaction mass is added slowly to a mixture of ice and water in order to effect hydrolysis. The ether solution of the hydrolyzate is separated from the aqueous portion of the hydrolysis reaction mass, neutralized by contact with solid sodium carbonate, and subsequently dried over anhydrous sodium sulfate. A portion of the hydrolyzate solution is combined with an amount of triethanolamine equal to about 1% of the weight of the hydrolyzate contained in the solution and the solvent is removed therefrom by gently heating under reduced pressure. The residue is an easily friable powder which is readily moldable under a pressure of 4000 lbs. per square inch at a temperature of 180° C. for a period of 30 minutes. The molding thus obtained may be removed from the mold while still hot without deforming its shape or adhering to the mold cavity and is an opaque, strong, tough, resinous body molding.

This experiment represents a further variation of the type of resin prepared in the manner described in Example IV above, the significant difference being in the use of concentrated phosphoric acid in place of concentrated sulfuric acid. Additional resinous materials having somewhat different physical characteristics are prepared in accordance with the suggestions of Example IV from materials of analogous chemical structure.

Example VIII 64 parts by weight of methyl alcohol are reacted with 224 parts by weight of benzyl silicon trichloride in the manner described in Part B of Example I above, to form a partial ester of the benzyl silicon trichloride; 15.5 parts by weight of the hydrolyzate of phenyl ethyl silicon dichloride, prepared in the manner described in Part A of Example I above, are added to the partial ester with vigorous agitation, and thereafter, 7 parts by weight of concentrated sulfuric acid (95%) are added to the mixture while it is heated to the reflux temperature. 40 parts by weight of a mixture of phenyl silicon trichloride and ethyl silicon trichloride (in a molar ratio of 0.8:0.2) are placed in a round-bottoms flask and combined with 10 parts by weight of the reaction product obtained from the partial ester of benzyl silicon trichloride, the hydrolyzate of phenyl ethyl silicon dichloride, and sulfuric acid. The combination of ingredients thus obtained is diluted with twice its volume of isopropyl ether and added slowly to a mixture of ice and water. After the cohydrolysis of the combination of hydrolyzable materials is completed, the ether solution of the cohydrolyzate is separated from the aqueous portion of the hydrolysis reaction mass. The ether solution of the cohydrolyzate is neutralized by contact with solid anhydrous sodium carbonate and subsequently dried over anhydrous sodium sulfate. A clear, amber solution of the cohydrolyzate in ether is obtained. A portion of the cohydrolyzate solution is combined with an amount of triethanolamine equal to approximately 1% of the weight of the cohydrolyzate therein. Subsequently, the solvent is removed therefrom by heating the solution under reduced pressure. The residue, upon evaporation of the solvent ether, is readily comminuted to a powder which is placed in a mold of cavity, and molded at a pressure of 4000 lbs. per square inch at a temperature of 180° C. for a period of 30 minutes. The molded article thus obtained is removed from the mold while still hot without the deforming of its shape or adhering to the walls of the mold cavity. The molding when cooled is somewhat elastic and yields to steadily applied pressure without breaking.

The product obtained is the cohydrolyzate of (1) a combination of benzyl dimethoxy chlorosilane and the hydrolyzate of phenylethyl silicon dichloride treated with concentrated sulfuric acid, and (2) a mixture of organo-silicon trichlorides. In Example V above, the hydrolyzate of (1) is a liquid. The product of the present experiment appears to be a true cohydrolyzate in that its properties are not intermediate, or additive of, those of its components, which properties would indicate a plasticizing of the hard, resinous hydrolyzate of the mixture of phenyl and ethyl silicon trichloride; nor does the molded article "sweat" upon further heating at 275° C., which condition would indicate a mere physical mixture of the individual hydrolyzates of the two components.

Other products of the present invention whose hydrolyzates are initially viscous oils or resilient, rubbery resins having little tensile and flexural strength, such, for example, as the hydrolyzate of the reaction product of a mixture of butyl dialkoxy silicon chloride and the hydrolyzates of dimethyl silicon dichloride, diethyl silicon dichloride, or phenyl ethyl silicon dichloride, treated with concentrated sulfuric acid or phosphoric acid, are similarly modified by combining such reaction product, prior to hydrolysis, with organo-silicon trihalides and cohydrolyzing the combination of these components. In like manner hard, tough, resinous hydrolyzates of the reaction product of a mixture of an organo-alkoxy halosilane and a hydrolyzate of a diorganosilicon dihalide with sulfuric or phosphoric acid, may be modified by combining such reaction product with diorgano-silicon dihalides, or triorgano-silicon halides, cohydrolyzing the mixture and isolating the cohydrolyzate. Many other combinations of analogues of these components will occur to those skilled in the art.

*Example IX*

A mixture of 167 parts by weight of phenyl silicon trichloride and 32 parts by weight of ethyl silicon trichloride is placed in a reactor fitted with a reflux condenser, dropping funnel, and mechanical agitator. The agitator is set in motion and 32 parts by weight of methyl alcohol sufficient to provide a monomethoxy partial ester are added to the mixture of organo-silicon chlorides from the dropping funnel over a period of about one hour. During the addition of the methyl alcohol, hydrogen chloride is evolved and the reactor and the contents thereof become cold. After all of the alcohol has been added, the reaction mass is heated to the temperature at which gentle refluxing occurs and is maintained at this temperature for a period of about two hours.

The contents of the reactor (195 parts by weight) are cooled and combined with 14 parts by weight of the hydrolyzate of dimethyl silicon dichloride; thereafter, 5.6 parts by weight of concentrated sulfuric acid are added to the mixture dropwise with vigorous agitation over a period of 15 minutes. The reaction mass is then heated to the temperature at which reflux begins and immediatey cooled to room temperature, diluted with about an equal volume of isopropyl ether and the diluted solution added to a volume of water and ice in large excess of that required theoretically to hydrolyze the reaction product. An ether solution of the hydrolyzate is separated from the aqueous portion of the hydrolysis reaction mass, neutralized by contact with solid sodium carbonate, and dried over anhydrous sodium sulfate. An amount of triethanolamine, equal to approximately 1% of the weight of hydrolyzate, is added to the ether solution and the ether removed therefrom by gently heating the solution under reduced pressure. A readily friable, hard foam is obtained.

The foam material is comminuted to a fine powder and molded at a pressure of 4000 lbs. per square inch at 180° C. for 30 minutes. The molded article is removed from the mold while hot without adhering to the sides of the mold or deforming its shape, and subjected to heating at 275° C. for four hours. The thus treated molding is found to have a hardness factor comparable to that of the molding described in Example IV, subjected to the same heat treatment, and is found to be slightly more brittle than such heat-treated material. Thus, it is shown that where $N=1$ in the formula $RSi(OY)_nX_{3-n}$, a material of valuable properties more or less comparable to the $n=2$ compounds is obtained.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method which includes the steps of combining a compound of the general formula $RSi(OY)_nX_{3-n}$, wherein R is selected from the group consisting of alkyl, aryl, alkaryl, and aralkyl radicals, Y is selected from the group consisting of primary alkyl, aryl, alkaryl, and aralkyl radicals, X is halogen, and $n$ is an integer from 1 to 2, inclusive, with a hydrolyzate of a compound of the general formula $R'R''SiX_2$, wherein R' and R'' are selected from the group consisting of alkyl, aryl, alkaryl, and aralkyl radicals, and X is halogen, and reacting the mixture thus obtained with a strong dehydrating mineral acid in the substantial absence of water.

2. The product of the method of claim 1.

3. The method which includes the steps of combining a compound of the general formula $RSI(OY)_nX_{3-n}$, wherein R is selected from the group consisting of alkyl, aryl, alkaryl, and aralkyl radicals, Y is selected from the group consisting of primary alkyl, aryl, alkaryl, and aralkyl radicals, X is halogen, and $n$ is an integer from 1 to 2, inclusive, with a hydrolyzate of a compound of the general formula $R'R''SiX_2$, wherein R' and R'' are selected from the group consisting of alkyl, aryl, alkaryl, and aralkyl radicals, and X is halogen, reacting the mixture thus obtained with a strong dehydrating mineral acid in the substantial absence of water, hydrolyzing the reaction product, and subjecting the hydrolyzate to intermolecular condensation.

4. The method which includes the steps of combining a compound of the general formula $RSI(OY)_2X$, wherein R is selected from the group consisting of alkyl, aryl, alkaryl, and aralkyl radicals, Y is selected from the group consisting of primary alkyl, aryl, alkaryl, and aralkyl radicals, and X is halogen, with a hydrolyzate of a compound of the general formula $R'R''SiX_2$, wherein R' and R'' are selected from the group consisting of alkyl, aryl, alkaryl, and aralkyl radicals, and X is halogen, and reacting the mixture thus obtained with a strong dehydrating mineral acid in the substantial absence of water.

5. The product of the method of claim 4.

6. The method which includes the steps of combining a compound of the general formula $RSi(OY)_2X$, wherein R is selected from the group consisting of alkyl, aryl, alkaryl, and aralkyl radicals, Y is selected from the group consisting of primary alkyl, aryl, alkaryl, and aralkyl radicals, X is halogen, with a hydrolyzate of a compound of the general formula R'R''CiX₂, wherein R' and R'' are selected from the group consisting of alkyl, aryl, alkaryl, and aralkyl radicals, and X is halogen, reacting the mixture thus obtained with a strong dehydrating mineral acid in the substantial absence of water, hydrolyzing the reaction product, and subjecting the hydrolyzate to intermolecular condensation.

7. The method which includes the steps of combining a compound of the general formula RSi(OY)X₂, wherein R is selected from the group consisting of alkyl, aryl, alkaryl, and aralkyl radicals, Y is selected from the group consisting of primary alkyl, aryl, alkaryl, and aralkyl radicals, X is halogen, with a hydrolyzate of a compound of the general formula R'R''SiX₂, wherein R' and R'' are selected from the group consisting of alkyl, aryl, alkaryl, and aralkyl radicals, and X is halogen, and reacting the mixture thus obtained with a strong dehydrating mineral acid in the substantial absence of water.

8. The product of the method of claim 7.

9. The method which includes the steps of combining a compound of the general formula RSi(OY)$_n$X$_{3-n}$, wherein R is selected from the group consisting of alkyl, aryl, alkaryl, and aralkyl radicals, Y is selected from the group consisting of primary alkyl, aryl, alkaryl, and aralkyl radicals, X is halogen, and n is an integer from 1 to 2, inclusive, with a hydrolyzate of a compound of the general formula R'R''SiX₂, wherein R' and R'' are selected from the group consisting of primary alkyl, aryl, alkaryl, and radicals, and X is halogen, reacting the mixture thus obtained with a strong dehydrating mineral acid in the substantial absence of water, mixing the reaction product with an organosilicon halide of the formula R$_a$SiX$_{4-a}$, wherein R is as above and a is an integer from 1 to 3, inclusive, cohydrolyzing said mixture, and subjecting the cohydrolyzate to intermolecular condensation.

10. The method which includes the steps of combining a compound of the general formula RSi(OCH₃)₂X, where R is lower alkyl, and X is halogen, with a hydrolyzate of a compound of the general formula R'R''SiX₂, wherein R' and R'' are selected from the group consisting of alkyl, aryl, alkaryl, and aralkyl radicals, and X is halogen, and reacting the mixture thus obtained with a strong dehydrating mineral acid in the substantial absence of water.

11. The product of the method of claim 10.

12. The method which includes the steps of combining a mixture of compounds of the general formulae C₆H₅Si(OY)₂X and C₂H₅Si(OY)₂X, where in each case Y is primary lower alkyl and X is halogen, with a hydrolyzate of a compound of the general formula R'R''SiX₂, wherein R' and R'' are selected from the group consisting of alkyl, aryl, alkaryl, and aralkyl radicals, and X is halogen, and reacting the mixture thus obtained with a strong dehydrating mineral acid in the substantial absence of water.

13. The product of the method of claim 12.

14. The method which includes the steps of combining a mixture of compounds of the general formulae C₆H₅Si(OY)₂X and C₂H₅Si(OY)₂X, where in each case Y is primary lower alkyl and X is halogen, with a hydrolyzate of a compound of the general formula R'R''SiX₂, wherein R' and R'' are lower alkyl radicals, and X is halogen, and reacting the mixture thus obtained with a strong dehydrating mineral acid in the substantial absence of water.

15. The product of the method of claim 14.

16. The method which includes the steps of combining a mixture of compounds of the general formulae C₆H₅Si(OCH₃)₂X and C₂H₅Si(OCH₃)₂X where the phenyl and the ethyl compounds exist in a ratio to each other of 4:1, and X is halogen, with a hydrolyzate of a compound of the general formula R'R''SiX₂, wherein R' and R'' are selected from the group consisting of alkyl, aryl, alkaryl, and aralkyl radicals, and X is halogen, and reacting the mixture thus obtained with a strong dehydrating mineral acid in the substantial absence of water.

17. The product of the method of claim 16.

18. The method which includes the steps of reacting a mixture of

C₆H₅Si(OCH₃)₂Cl and C₂H₅Si(OCH₃)₂Cl in a mol ratio of 4:1 and a hydrolyzate of a compound of the general formula (CH₃)₂SiCl₂ with a strong dehydrating mineral acid in the substantial absence of water.

19. The product of the method of claim 18.

20. The method which includes the steps of combining a compound of the general formula RSi(OCH₃)$_n$X$_{3-n}$, wherein R is aralkyl X is halogen, and n is an integer between 1 and 2 inclusive, with a hydrolyzate of a compound of the general formula R'R''SiX₂, wherein R' and R'' are lower alkyl, and X is halogen, and reacting the mixture thus obtained with a strong dehydrating mineral acid in the substantial absence of water.

21. The product of the method of claim 20.

22. The method which includes the steps of reacting a predominating portion of

C₆H₅CH₂Si(OCH₃)₂Cl and a smaller portion of a hydrolyzate of (CH₃)₂SiCl₂ with a strong dehydrating mineral acid in the substantial absence of water.

23. The product of the method of claim 22.

24. The method which includes the steps of combining a compound of the general formula RSi(OY)$_n$X$_{3-n}$, wherein R is selected from the group consisting of alkyl, aryl, alkaryl, and aralkyl radicals, Y is selected from the group consisting of primary alkyl, aryl, alkaryl, and aralkyl radicals, X is halogen, and n is an integer from 1 to 2, inclusive, with a hydrolyzate of a compound of the general formula (CH₃)₂SiCl₂, and reacting the mixture thus obtained with a strong dehydrating mineral acid in the substantial absence of water.

25. The product of the method of claim 24.

26. The method which includes the steps of combining a hydrolyzable organo-silicon halide of the formula R$_a$SiX$_{4-a}$, wherein R is selected from the group consisting of alkyl, aryl, alkaryl, and aralkyl radicals, a is an integer from 1 to 3, inclusive, and X is halogen, and the reaction product of the process of claim 1 and cohydrolyzing said combination.

27. The composition of matter which comprises a hydrolyzable organo-silicon halide of the formula R$_a$SiX$_{4-a}$, wherein R is selected from the group consisting of alkyl, aryl, alkaryl, and aralkyl radicals, a is an integer from 1 to 3, inclusive, and X is halogen, and the reaction product of the process of claim 1.

JOHN E. DEREICH.

References Cited in the file of this patent

UNITED STATES PATENTS

| Number | Name | Date |
|---|---|---|
| 2,375,998 | McGregor et al. | May 15, 1945 |
| 2,397,895 | Warrick | Apr. 2, 1946 |
| 2,413,582 | Rust et al. | Dec. 31, 1946 |
| 2,442,212 | Rochow | May 25, 1948 |
| 2,467,976 | Hyde | Apr. 19, 1949 |
| 2,469,154 | Bunnell et al. | May 3, 1949 |
| 2,470,479 | Ferguson et al. | May 17, 1949 |
| 2,481,349 | Robie | Sept. 6, 1949 |
| 2,486,162 | Hyde | Oct. 25, 1949 |
| 2,502,286 | Sowa | Mar. 28, 1950 |
| 2,521,673 | Britton | Sept. 12, 1950 |